US00RE36924E

United States Patent [19]

Fisher et al.

[11] E Patent Number: Re. 36,924

[45] Reissued Date of Patent: Oct. 24, 2000

[54] EMBOSSED DENTAL BIB WITH REDUCED-SIZED ADHESIVE MEANS

[76] Inventors: Sheldon Fisher, 10715 Springdale Ave., Sante Fe Springs, Calif. 90670; Allen Orofino; Richard Allen Orofino, both of 10 Ranick Rd., Hauppauge, N.Y. 11778

[21] Appl. No.: 09/326,328

[22] Filed: Jun. 7, 1999

Related U.S. Patent Documents

Reissue of:

[64] Patent No.: 5,672,056
Issued: Sep. 30, 1997
Appl. No.: 08/657,348
Filed: Jun. 3, 1996

[51] Int. Cl.[7] ..... A41D 13/00; A41B 13/10

[52] U.S. Cl. ..... 433/137; 2/49.1

[58] Field of Search ..... 433/137, 49.1, 433/49.2, 49.3, 49.4, 49.5; 128/849, 852; 604/390, 389

[56] References Cited

U.S. PATENT DOCUMENTS

| | | | |
|---|---|---|---|
| 2,900,640 | 8/1959 | Haydu | 2/49.1 |
| 3,329,969 | 7/1967 | Farber et al. | 2/49.4 |
| 3,488,773 | 1/1970 | Stemmer | 2/52 |
| 4,023,570 | 5/1977 | Chinai et al. | 604/390 |
| 4,068,665 | 1/1978 | Nelson | 604/390 |
| 4,410,325 | 10/1983 | Lare | 604/389 |
| 4,523,334 | 6/1985 | Lavash | 604/390 |
| 4,660,226 | 4/1987 | Quilling et al. | 2/49.4 |
| 4,733,411 | 3/1988 | Foti | 2/49.1 |
| 4,743,242 | 5/1988 | Grube et al. | 604/389 |
| 4,808,252 | 2/1989 | Lash | 604/385.2 |
| 4,857,067 | 8/1989 | Wood et al. | 604/389 |
| 4,959,265 | 9/1990 | Wood et al. | 604/389 |

*Primary Examiner*—Paul J. Hirsch
*Attorney, Agent, or Firm*—Myron Amer P.C.

[57] ABSTRACT

A dental bib to be adhesively attached to a patient having desirable nominally-sized areas of adhesive deposits which nevertheless adhere as firmly as currently used large-sized deposits as a result of using recesses in an embossed pattern on the dental bib for making available increased amounts of adhesive, wherein the area over which the adhesive is spread and now also the depth of the adhesive contributes to achieving the attachment function.

3 Claims, 1 Drawing Sheet

EMBOSSED DENTAL BIB WITH REDUCED-SIZED ADHESIVE MEANS

Matter enclosed in heavy brackets [ ] appears in the original patent but forms no part of this reissue specification; matter printed in italics indicates the additions made by reissue.

The present invention relates generally to improvements for adhesively attaching a dental bib or towel to a patient, the improvements more particularly enabling the use of an optimum nominal area for the adhesive used without adverse effect on the adhesive attachment it achieves.

Examples of the Prior Art

Dental bibs eschewing the use of a neck-encircling chain and so-called alligator clip connections to the bib as a means of attachment to a patient and using, instead, deposits of adhesive to establish attachment to a patient, are already well known, as exemplified by U.S. Pat. No. 4,660,226 for "Bib" issued to Quilling et al. on Apr. 28, 1987 and U.S. Pat. No. 3,488,773 for "Dental Towel" issued to S. A. Stemmer on Jan. 13, 1970.

These and all other known adhesively-attached dental bibs require either sizable areas as the sites of the adhesive deposit or a plurality of such sites, in order to achieve an adhesive attachment to the patient that will keep the bib in place until manually removed. A thin coating of the adhesive, as is used in these prior art bibs, is inadequate for the purposes intended unless deposited over a sizable area or, if deposited over a smaller area, then deposited at more than just the two opposite corners of the bib as used in the within inventive dental bib.

Broadly, it is an object of the present invention to embody adhesive means on a dental bib that is effective in establishing adhesive securement to a patient of an optimum nominal size and number, overcoming the foregoing and other shortcomings of the prior art.

More particularly, it is an object to enhance the attaching function of the adhesive of the dental bib not only by its circumscribed surface area but also by its increased thickness, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIGS. 1 and 2 respectively are perspective views of a prior art dental bib having adhesive means of a prescribed size for attachment to a patient;

FIG. 3 is a cross sectional view as taken along line 3—3 of FIG. 2;

FIGS. 4 and 5, like FIGS. 1 and 2, similarly are respectively front and rear perspective views of an adhesively attached dental bib, but of the within inventive embodiment characterized by an optimum nominally sized adhesive means;

Figure 5:
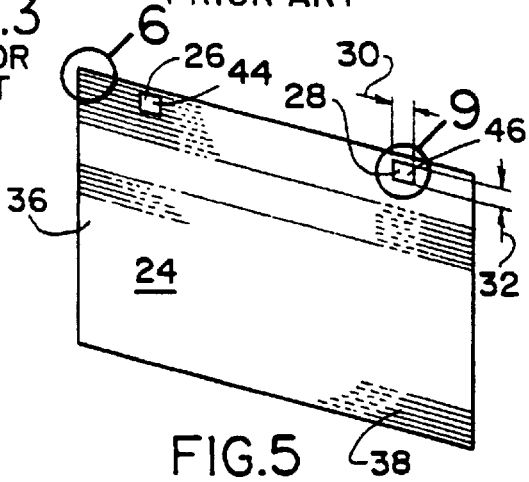
Figure 7:
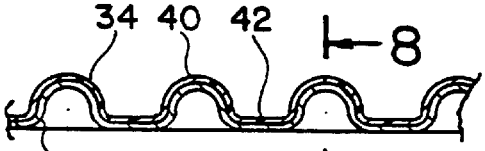
FIG. 7 is a cross sectional view as taken along line 7—7 of FIG. 6.
Figure 9:
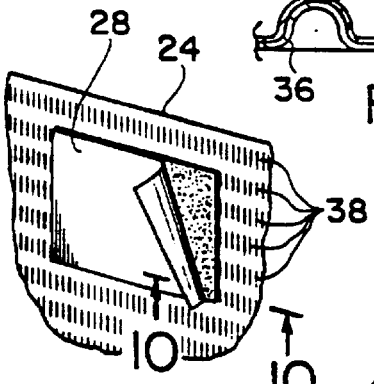
Figure 6:
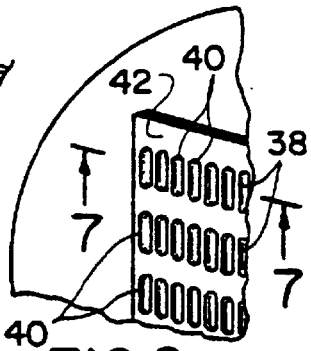
FIG. 6 is a partial perspective view, on an enlarged scale, depicting the structural features within the reference circle 6 of FIG. 5.
Figure 8:
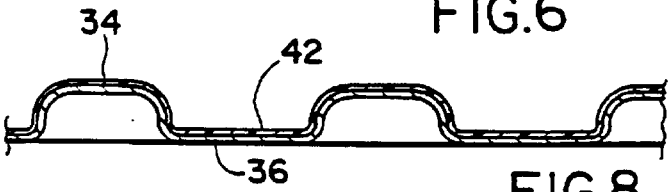
FIG. 8 is an enlarged scale sectional view as taken along line 8—8 of FIG. 7.
Figure 10:
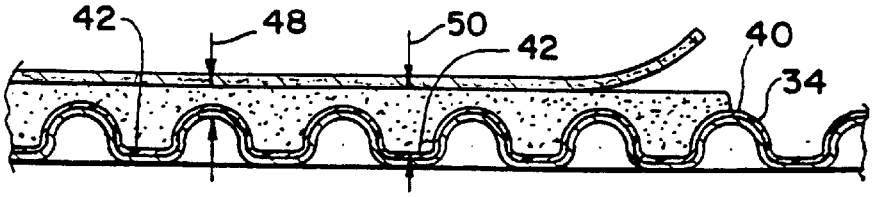

FIG. 9 like FIG. 6 is a partial perspective view, on an enlarged scale, but depicting the structural features within the reference circle 9 of FIG. 5; and FIG. 10 is a cross sectional view as taken along line 10—10 of FIG. 9.

Figure 1:
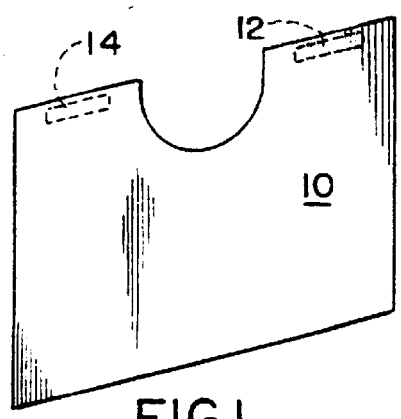
FIG.1 PRIOR ART
Figure 3:
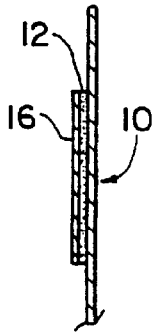
FIG.3 PRIOR ART
Figure 2:
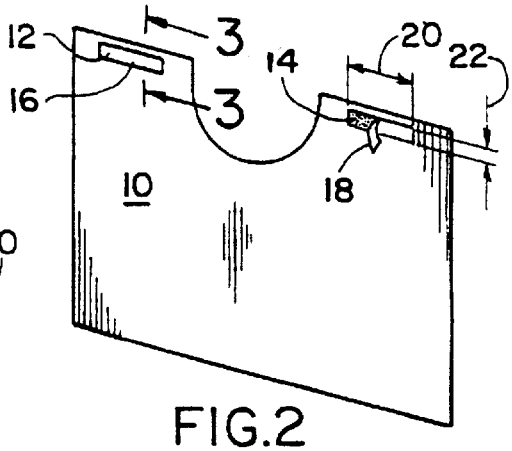
FIG.2 PRIOR ART
Figure 4:
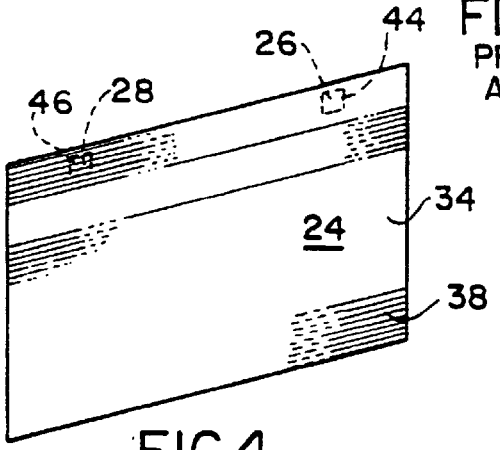

The prior art illustrated in FIGS. 1–3 is a dental bib 10 of a known type having prescribed sized adhesive deposits 12 and 14 in the corner locations illustrated which are exposed upon removal of adhesive-inert release tabs 16 and 18 preparatory to establishing adhesive attachment to a patient (not shown) to enable the bib to serve as a cover against water splatter and the like. The prescribed rectangular size of the adhesive deposit to effectively maintain the bib 10 in adhesive attachment to the patient is typically 2-⅞" as measured along the length 20 and ½" as measured along the width 22.

It is desirable to significantly diminish the size of the patient-attaching deposit to correspondingly diminish any adhesive residue on the patient's clothing and to attain other benefits, as will be better understood as the description proceeds.

To this end, the within inventive bib 24 has a cooperating pair of adhesive deposits at 26 and 28, which provide as much and even greater adhesive attachment as provided by the large-sized adhesive deposits 12 and 14 and yet measure only 1" along its length 30 and ¾" along its width 32.

Underlying the present invention is the recognition that according to current practice bib 24 is comprised as a two-ply construction consisting of a water impervious plastic outwardly facing ply 34 and a pulp tissue inwardly facing ply 36 and, most important, that the attachment of the plies to each other is achieved by pressing them together while the plies are fed in face-to-face relation through a pressure nip, wherein as is well-known the chemical constituency of the pulp tissue serves as a binder joining together the two plies. Further in this regard, it is understood that embossing the bib 24 in the pressure nip enhances the attachment of the plies to each other and that said embossment can be used to advantage to contribute to an optimum nominally sized patient-attaching adhesive deposit.

Thus, selecting as the bib 24 to be provided with the small sized adhesive deposits 26 and 28 is one confined to a two-ply tissue-plastic film construction embodied with an embossment pattern, generally designated 38, consisting of alternately spaced apart horizontally oriented raised surfaces, individually and collectively designated 40, bounding therebetween correspondingly alternately spaced apart horizontally oriented recesses, individually and collectively designated 42. In upper left and right hand corners, as at 44 and 46, there are provided the 1"×¾" adhesive deposits 26 and 28 wherein, as best understood from the enlarged scale sectional view of FIG. 10, the adhesive deposited covers the raised surfaces 40 in a nominal extent 48, but is of a significantly optimum increased amount or extent 50 as permitted by the filling of the adhesive of the recesses 42.

In practice it has been found that the availability of increased amounts of the adhesive 26,28 from the recesses 42 achieves effective attachment to the patient despite the confinement of the adhesive to the nominal area of 1" by ¾.

While the dental bib herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a dental bib with adhesive means thereon for adhesive attachment to a patient, said improvements comprising a rectangular two-ply bib construction of a water impervious plastic outwardly facing ply and a pulp tissue inwardly facing ply, an embossment pattern embodied in said two ply construction consisting of alternately spaced apart horizontally oriented raised surfaces bounding therebetween correspondingly alternately spaced apart horizontally oriented recesses, and in each upper left and right corner of said bib pulp tissue ply a rectangularly shaped site for an adhesive not exceeding one inch in length and three quarters of an inch in width, a deposit of adhesive in an amount filling said recesses at said adhesive site and of an excess amount forming a layer in covering relation over said raised surfaces, whereby each said rectangularly shaped adhesive site is effective for establishing an adhesive attachment to said patient due to the availability of said adhesive from said recesses.

*2. Improvements for a bib comprising a rectangular two-ply bib construction of a water impervious plastic outwardly facing ply and pulp tissue inwardly facing ply, an embossment pattern embodied in said two ply construction consisting of alternately spaced apart horizontally oriented raised surfaces bounding therebetween correspondingly alternately spaced apart horizontally oriented recesses, and in each upper left and right corner of said bib pulp tissue ply a rectangularly shaped site for an adhesive not exceeding one inch in length and three-quarters of an inch in width, a deposit of adhesive in an amount filling said recesses at said adhesive site and of an excess amount forming a layer in covering relation over said raised surfaces, whereby each said rectangularly shaped adhesive site is effective for establishing an adhesive attachment due to the availability of said adhesive from said recesses.*

*3. Improvements for a bib comprised of embossible paper construction material and comprising a rectangular front panel delineated therefrom, an embossment pattern embodied in said front panel consisting of adjacent raised and recessed front panel areas, and in at least one upper corner of said front panel a rectangularly shaped site for an adhesive not exceeding one inch in length and three-quarters of an inch in width, a deposit of adhesive in an amount filling said recesses at said adhesive site and of an excess amount forming a layer in covering relation over said raised surfaces, whereby said rectangularly shaped adhesive site is effective for establishing an adhesive attachment due to the availability of said adhesive from said recesses.*

* * * * *